No. 750,633. PATENTED JAN. 26, 1904.
H. G. FISKE.
MULTIPLE TUBE PNEUMATIC TIRE.
APPLICATION FILED JUNE 17, 1899.
NO MODEL. 2 SHEETS—SHEET 1.

Witnesses;
J. E. Coleman
M. V. Thompson.

Inventor.
Henry G. Fiske
By Sturtivant & Greeley
Att'ys

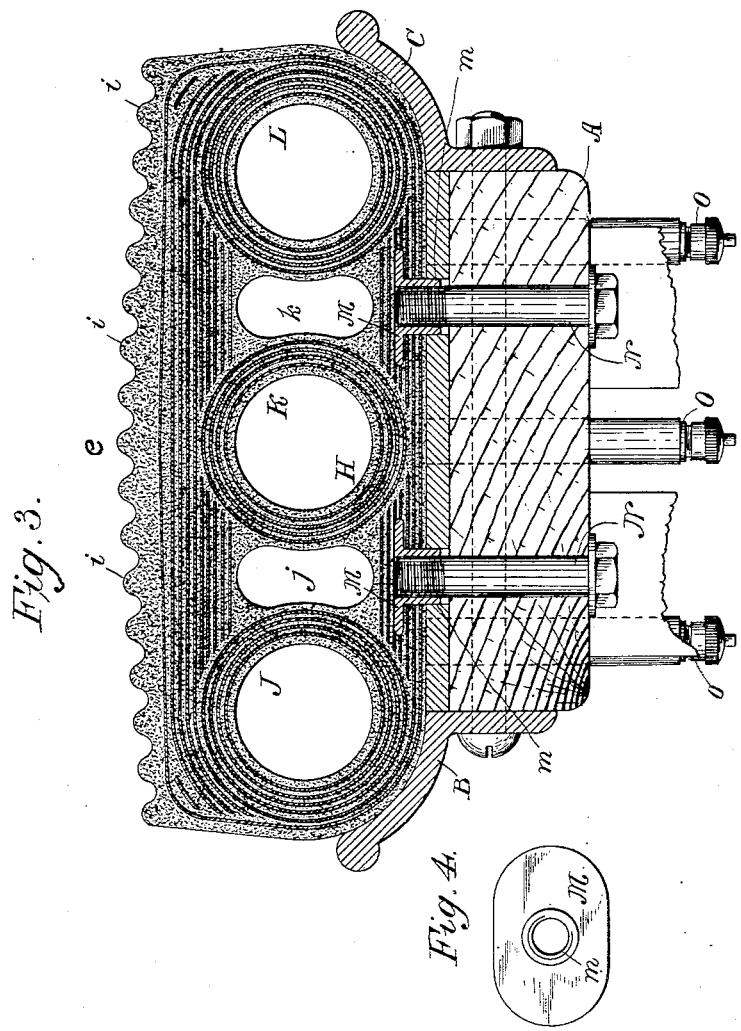

No. 750,633. Patented January 26, 1904.

UNITED STATES PATENT OFFICE.

HENRY G. FISKE, OF NEW YORK, N. Y., ASSIGNOR, BY MESNE ASSIGNMENTS, TO MORTON TRUST COMPANY, TRUSTEE, A CORPORATION OF NEW YORK.

MULTIPLE-TUBE PNEUMATIC TIRE.

SPECIFICATION forming part of Letters Patent No. 750,633, dated January 26, 1904.

Application filed June 17, 1899. Serial No. 720,914. (No model.)

*To all whom it may concern:*

Be it known that I, HENRY G. FISKE, a citizen of the United States of America, and a resident of the city of New York, county of New York, and State of New York, have invented certain new and useful Improvements in Multiple-Tube Pneumatic Tires, of which the following is a specification.

My invention relates to improvements in pneumatic tires for vehicle-wheels, (type "M.")

A tire embodying my invention comprises a plurality of inner tubes within which the air is compressed, said tubes being arranged side by side, together with an outer casing and a tread portion extending across and covering the inner tubes, producing a substantially flat-faced tire. Two or more inner tubes can be so arranged parallel with each other to form the pneumatic support of a single tread. There are also in some instances cavities formed between the adjacent sides of the parallel inner air-tubes, so as to admit of their expansion or distortion sidewise or in lateral direction, which will give greater elasticity at the same pressure of air, all as will hereinafter more fully appear and be referred to in the appended claims.

Figure 1:
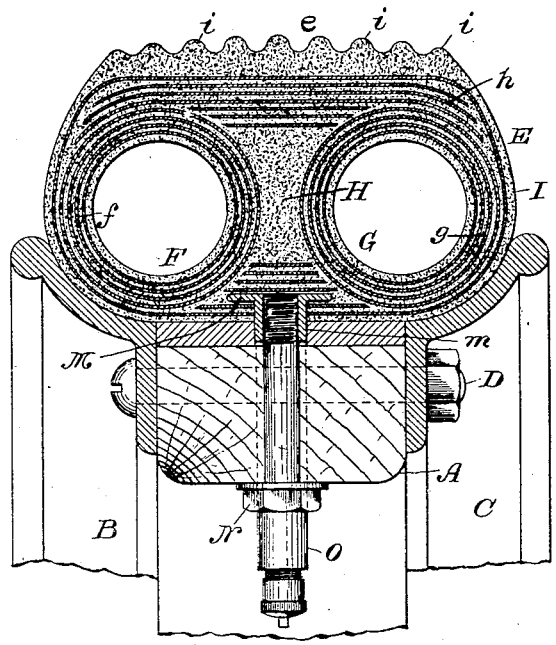
Figure 2:
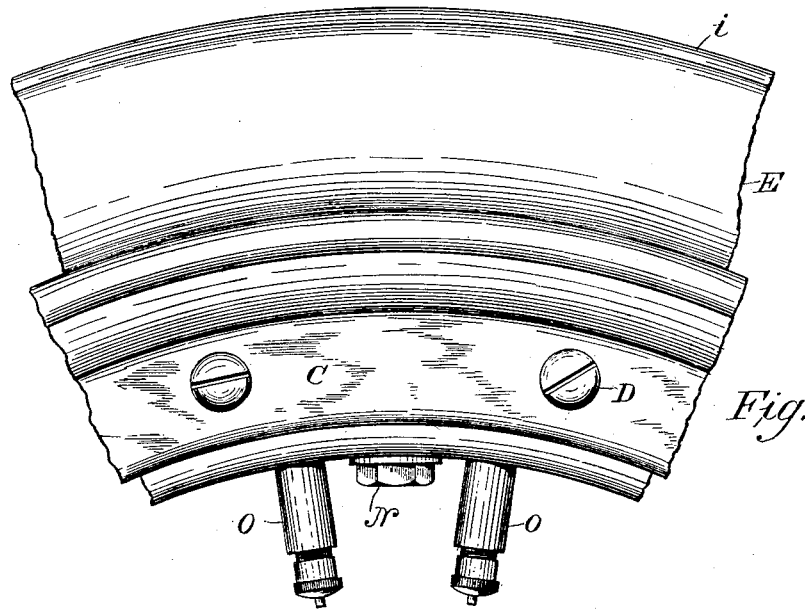

In the accompanying drawings, Figure 1 is a transverse sectional view of a tire embodying my invention. Fig. 2 is a side elevation of a portion of a tire and rim shown in Fig. 1. Fig. 3 is a transverse elevation showing a construction of tire provided with three parallel inner tubes. Fig. 4 is a detail view of one of the locking-plates which is embedded in the tire.

A is a central felly which may desirably be made of wood and which receives the outer ends of the spokes. To the sides of the felly are attached metallic flanges B C, which have parallel side portions adapted to fit against the sides of the felly and be securely attached thereto by bolts D, passing through the felly and the said outwardly-extending portions of the flanges. The flanges B C flare outwardly and upwardly and in combination with the felly or the band on the periphery thereof form a suitable seat for the reception of the tire E, and yet these flanges do not extend upwardly far enough to prevent lateral distortion of the tire. The tire E departs from the usual circular cross-section, being extended laterally and forming a flat tread, and the peculiar form of this tire is due to its construction.

As indicated in Fig. 1, F G are two air-tubes, each of which is strongly reinforced by fabric *f g*, applied externally thereto in the usual manner. The tubes F G are arranged side by side—that is, parallel with each other—with a filling H of elastic material between them. The gradually-enlarging space between the exteriors of the adjacent upper portions of the said tubes F G is filled in with alternating layers of elastic material and fabric for strengthening and protection of the said tubes. Additional layers *h* of fabric are placed so as to extend across the tire from the outer sides of the tubes F G, protecting their tread portions and bridging the space between them. This arrangement of the fabric extending between the several tubes and embedded in the rubber which forms the tread of the tire is one of the special features of the device. It is obvious that by thus tying the several air-tubes in fixed relation to each other that any strains which are imposed upon the tread of the tire will cause the tubes to expand individually in a lateral direction and will prevent lateral movement of either of the tubes independent of the movement of the tire as a whole, and an additional layer of fabric I may also be placed around the entire structure to keep everything in position. A layer of rubber is formed on the exterior of the outer fabric, and this material is increased in thickness upon the tread portion *e*, which may be provided with corrugations *i*, if desired.

In Fig. 3 I have shown an arrangement similar to that already described, except that three inner air-tubes J K L are employed and that cavities *j k* are formed in the elastic material between the adjoining inner sides of the tubes, so that the tubes may extend laterally. These cavities serve practically the same purpose as the soft filling H described in connection with the form of tire shown in Fig. 1, but permit even more and quicker action of the air-tubes than the former construction.

In order to attach this tire to the rim, metallic plates are embedded in its under side. M represents the plates referred to which have central screw-threaded sockets m, from which the plates M extend, the latter being embedded between the layers of the fabric in the under side of the tire, where they will be securely held. N represents bolts extending up through the felly into engagement with the said sockets and by which the tire is detachably secured in position.

A cavity, such as shown in Fig. 3, may be formed in the elastic material H, interposed between the two tubes in Fig. 1, if desired, and it will also be understood that more than three tubes may be employed, if desired, although I have considered that the invention will be sufficiently set forth by the illustration of such number.

It will be noted that the annular chamber or filling which is interposed between the adjacent surfaces of the several tubes leaves the thinnest portion of the tire on the line joining the centers of the several tubes, and thus as the tire is put under tension any tendency for the tube to distort will take place on this central line at a point remote from the wearing-surface of the tire. These chambers coöperating with the bridging layers of fabric, shown as at h, cause the tubes when under pressure to be distorted toward the central line of the tire and prevent it from being forced out over the edge of the retaining-flanges to any great degree.

Each air-tube is provided with a valved inlet O of the usual type through which said tubes are separately supplied with compressed air.

It will be apparent that in view of the foregoing description minor modifications and changes may be made without departing from the invention. I therefore do not limit myself to the exact construction set forth.

Having described my invention, what I claim is—

1. The combination with a felly having a substantially flat outer tread, of an elastic tire having its width greater than its thickness and having its seat portion substantially flat from side to side, whereby it can be slid upon the felly from either side, said seat portion of the elastic tire being of greater width than the width of the felly, a flange at each side of the felly standing against the flat side portion of the felly and having an abrupt offset starting on a level with and laterally from the flat tread of the felly, said flanges curving upward and inclosing the lateral edges of the elastic tire, and bolts passing through said flanges and felly to secure the whole in position; substantially as described.

2. In combination with a felly comprising a main felly portion and a superimposed metal band, said main felly portion and band each having a flat face or tread of uniform diameter, an elastic tire having its width greater than its thickness and being of greater width than the felly resting on the flat face of the felly, side flanges each having a straight side portion engaging the side of the felly and offset at right angles flush with the face of the felly, said flanges extending outward and turning upward, and having a bead portion formed at their extreme edges, the overhanging edges of the superimposed elastic tire resting within the lateral flange extension and the lateral walls of said elastic tire being within the lateral limits of the outwardly-extending portion of said flanges, whereby said lateral flanges protect the elastic tire from abrasion; substantially as described.

3. In combination with a compound felly, a superimposed elastic tire having its width greater than its thickness and having a normal tread portion of greater width than the felly, said felly-tread and base portion being substantially horizontal, whereby the tire may be slipped upon the felly from either side, detachable lateral flanges engaging respectively opposite sides of the felly and each offset flush with the tread of the felly starting at right angles with the main portion of the flanges and curved upward supporting the overhanging portion of the elastic tire, and bolts passing through the felly and the side flanges securely holding the whole in position; substantially as described.

4. In combination with a felly and an encircling metal band presenting a flat tread from side to side thereof, lateral flanges engaging with the sides of said felly and offset at the level of the flat tread, whereby an extended flat seat portion is presented having a substantially level portion of a width greater than the felly, the lateral flanges being extended outward and upward, a one-piece elastic tire having its width greater than its thickness and being of greater width than the felly and having a flat level seat whereby it may be slipped upon the felly from either side, the base portion of said tire having its lateral edges overhanging the main felly portion, said lateral edges supported by and inclosed in the upper portion of said side flanges, whereby said side flanges project beyond and thereby not only support but also protect the lateral portions of said tire against abrasion from outside sources; substantially as described.

5. A tire, comprising a plurality of rubber air-tubes, having inclosing layers of fabric and elastic material, and spaced apart at their adjacent sides and wholly embedded in india-rubber, which is deposited in the spaces between, surrounds the tires, and secures them firmly together; substantially as described.

6. A tire, comprising a plurality of rubber air-tubes, having inclosing layers of fabric and elastic material, and spaced apart at their adjacent sides and wholly embedded in india-rubber, which is deposited in the spaces between, surrounds the tires, and secures them firmly together, the rubber being thickened at the outer periphery of the tire to form the tread; substantially as described.

7. A tire, comprising a plurality of parallel, reinforced air-tubes, spaced apart at their adjacent sides, and wholly embedded in india-rubber which fills the spaces, surrounds the tires, and secures them firmly together, and a layer of fabric embedded in the rubber around both of said tubes to assist in holding the parts in position; substantially as described.

8. A tire, comprising a plurality of parallel, reinforced air-tubes, spaced apart at their adjacent sides, and wholly embedded in and surrounded by india-rubber, layers of fabric of varying width embedded in the rubber in the upper and lower widening spaces between said tubes, and a layer of fabric embedded in the rubber around both tubes and the said layers of fabric to hold the parts in position; substantially as described.

9. A tire, comprising a plurality of parallel, reinforced air-tubes, spaced apart at their adjacent edges and wholly embedded in india-rubber, an annular air-passage being formed in the rubber between the adjacent sides of the tubes to allow them to expand or flatten inwardly, a strengthening-band embedded in the rubber around said tubes; substantially as described.

10. A tire, comprising a plurality of parallel, reinforced air-tubes, wholly embedded in india-rubber which extends outwardly beyond the tubes to form the tread, layers of fabric embedded in the rubber within the gradually widening spaces between the tubes, a strengthening band or layer of fabric embedded in the rubber around the said tubes and serving to hold all the parts together, and fastening devices embedded in the inner bridging bands and rubber and exposed through the tire; substantially as described.

11. A tire, comprising a plurality of rubber air-tubes, having inclosing layers of fabric and elastic material, and embedded side by side and wholly inclosed by india-rubber thickened to form the tread, layers of fabric embedded in the rubber within the gradually widening spaces between the tubes, a strengthening band or strip embedded in the rubber and inclosing said tubes and layers of fabric to bind the parts together, and fastening devices embedded in the inner layers of fabric and rubber and exposed through the tire; substantially as described.

Signed by me at New York, N. Y., this 16th day of June, 1899.

HENRY G. FISKE.

Witnesses:
FRANKLAND JANNUS,
JOEL S. DE SELDING.